(12) United States Patent
Harper et al.

(10) Patent No.: US 9,316,257 B2
(45) Date of Patent: Apr. 19, 2016

(54) SPHERICAL BEARING WITH SEALING MEMBER MEMBER (71) Applicant: Roller Bearing Company of America, Inc., Oxford, CT (US)

(72) Inventors: Marc Harper, Patterson, NY (US); Andrew Henn, Monroe, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 462 days.

(21) Appl. No.: 13/936,574

(22) Filed: Jul. 8, 2013

(65) Prior Publication Data
US 2014/0016888 A1 Jan. 16, 2014

Related U.S. Application Data (63) Continuation-in-part of application No. 13/078,486, filed on Apr. 1, 2011, now abandoned.

(51) Int. Cl.
*B62D 7/18* (2006.01)
*F16C 33/74* (2006.01)
*F16C 11/06* (2006.01)
*F16C 23/04* (2006.01)

(52) U.S. Cl.
CPC ............. *F16C 33/74* (2013.01); *F16C 11/0614* (2013.01); *F16C 11/0676* (2013.01); *F16C 23/045* (2013.01); *F16C 2326/05* (2013.01); *F16C 2326/24* (2013.01); *F16C 2350/00* (2013.01)

(58) Field of Classification Search
CPC .............. Y10T 403/31; Y10T 403/315; Y10T 403/32729; B62D 7/18
See application file for complete search history.

(56) References Cited

U.S. PATENT DOCUMENTS

| 2,630,356 A | 3/1953 | Johnson |
| 3,547,474 A | 12/1970 | Colletti et al. |
| 3,591,192 A | 7/1971 | Sharp |

(Continued)

FOREIGN PATENT DOCUMENTS

| CN | 2789498 Y | 6/2006 |
| CN | 200942698 Y | 9/2007 |

(Continued)

OTHER PUBLICATIONS

International Search Report for US/PCT2012/047331, dated Oct. 18, 2012.

(Continued)

*Primary Examiner* — Michael P Ferguson
(74) *Attorney, Agent, or Firm* — MKG, LLC (57) ABSTRACT

A sealed spherical bearing includes a ball disposed in a race, an annular seal extending between the race and the ball, and a retainer secured to the seal. A retainer first leg axially outward facing surface is secured to a seal first leg axially inward facing surface, and a retainer second leg radially inward facing surface is secured to a seal first leg radially outward facing surface. The retainer and the seal are separately formed elements. The retainer and the seal secured thereto is press-fit into a first annular groove of the race such that a first groove radially inward facing surface engages a retainer second leg radially outward facing surface, a first groove axially outward facing surface engages a retainer first leg axially inward facing surface, and the retainer is fixed relative to the race.

20 Claims, 10 Drawing Sheets (56) References Cited

U.S. PATENT DOCUMENTS

| | | | |
|---|---|---|---|
| 3,700,297 A | 10/1972 | Fickenwirth | |
| 3,814,446 A | 6/1974 | Derman | |
| 3,822,100 A | 7/1974 | Reinsma et al. | |
| 3,848,938 A | 11/1974 | Stella | |
| 3,900,408 A | 8/1975 | Turner | |
| 4,034,996 A | 7/1977 | Manita | |
| 4,052,804 A | 10/1977 | Stedman | |
| 4,080,013 A | 3/1978 | Koch | |
| 4,089,095 A | 5/1978 | Becker | |
| 4,109,976 A | 8/1978 | Koch | |
| 4,130,324 A | 12/1978 | Becker | |
| 4,210,405 A | 7/1980 | Jesswein | |
| 4,239,243 A | 12/1980 | Bainard et al. | |
| 4,311,316 A | 1/1982 | Cather, Jr. | |
| RE31,298 E | 7/1983 | Herbenar | |
| 4,447,094 A | 5/1984 | Trudeau | |
| 4,553,760 A * | 11/1985 | Reed et al. | 277/503 |
| 4,674,164 A | 6/1987 | McCloskey | |
| 4,810,233 A | 3/1989 | Crane, Jr. et al. | |
| 4,869,602 A | 9/1989 | Berg | |
| 5,004,248 A | 4/1991 | Messenger et al. | |
| 5,033,872 A | 7/1991 | Ueno | |
| 5,133,609 A | 7/1992 | Ishiguro | |
| 5,222,816 A | 6/1993 | Kondoh | |
| 5,242,228 A | 9/1993 | Hattori | |
| 5,288,354 A | 2/1994 | Harris et al. | |
| 5,419,642 A | 5/1995 | McLarty | |
| 5,441,351 A | 8/1995 | Grunze | |
| 5,480,231 A | 1/1996 | Sasaki | |
| 5,573,336 A | 11/1996 | Maroney | |
| 5,577,741 A | 11/1996 | Sink | |
| 5,655,845 A | 8/1997 | Lampart | |
| 5,993,065 A | 11/1999 | Ladzinski et al. | |
| 6,082,905 A | 7/2000 | Vignotto et al. | |
| 6,190,080 B1 | 2/2001 | Lee | |
| 6,217,031 B1 | 4/2001 | Catalano et al. | |
| 6,273,406 B1 | 8/2001 | Miyamoto et al. | |
| 6,325,544 B1 | 12/2001 | Sasaki | |
| 6,349,470 B1 | 2/2002 | Sasaki et al. | |
| 6,626,575 B2 | 9/2003 | Hartl | |
| 6,652,179 B2 | 11/2003 | De Freitas | |
| 6,955,473 B2 | 10/2005 | Reddehase et al. | |
| 7,017,890 B2 | 3/2006 | Rechtien | |
| 7,244,074 B2 | 7/2007 | Abels | |
| 7,464,968 B2 | 12/2008 | Sakazaki et al. | |
| 7,547,146 B2 | 6/2009 | Kinno | |
| 7,568,840 B2 | 8/2009 | Smith | |
| 7,654,766 B2 | 2/2010 | Zuge | |
| 7,658,546 B2 | 2/2010 | Clarke | |
| 8,038,351 B2 | 10/2011 | Arnold et al. | |
| 8,783,953 B2 | 7/2014 | Voisine et al. | |
| 8,801,318 B2 | 8/2014 | Knoble et al. | |
| 8,905,879 B2 | 12/2014 | Lannutti et al. | |
| 2003/0095729 A1 | 5/2003 | Post | |
| 2003/0187512 A1 | 10/2003 | Frederick | |
| 2006/0098908 A1 | 5/2006 | Clarke | |
| 2006/0171775 A1 | 8/2006 | McLaughlin et al. | |
| 2007/0019895 A1 | 1/2007 | Smith | |
| 2007/0065057 A1 | 3/2007 | Smith | |
| 2008/0040886 A1 | 2/2008 | Arnold | |
| 2011/0033227 A1 | 2/2011 | Kwon | |
| 2011/0091143 A1 | 4/2011 | Murphy | |
| 2012/0248723 A1 | 10/2012 | Harper et al. | |
| 2014/0016888 A1 | 1/2014 | Harper et al. | |

FOREIGN PATENT DOCUMENTS

| | | |
|---|---|---|
| CN | 101240811 A | 8/2008 |
| CN | 201277260 Y | 7/2009 |
| CN | 201771976 U | 3/2010 |
| CN | 201487175 U | 5/2010 |
| CN | 201494270 U | 6/2010 |
| CN | 202883719 U | 4/2013 |
| CN | 203362845 U | 12/2013 |
| DE | 2755502 A1 | 6/1979 |
| DE | 8309873 | 9/1983 |
| DE | 3725404 A1 | 3/1989 |
| DE | 3725404 C2 | 8/1989 |
| DE | 19834678 A1 | 2/2000 |
| DE | 19834677 C2 | 10/2002 |
| DE | 19834678 C2 | 10/2003 |
| DE | 10256334 A1 | 6/2004 |
| DE | 102007039858 A1 | 3/2008 |
| DE | 102008029449 A1 | 12/2009 |
| DE | 102008037990 A1 | 2/2010 |
| EP | 553565 A2 | 8/1993 |
| EP | 0903509 A1 | 3/1999 |
| EP | 1114938 A1 | 7/2001 |
| EP | 2505858 A2 | 10/2012 |
| EP | 2505858 A3 | 10/2012 |
| FR | 1488848 A | 7/1967 |
| FR | 2056118 | 5/1971 |
| FR | 2171567 | 9/1973 |
| GB | 915758 | 1/1963 |
| GB | 2400149 A | 6/2004 |
| JP | 2195013 A | 8/1990 |
| JP | 425609 A | 1/1992 |
| JP | 06123315 A | 5/1994 |
| JP | 07190066 A | 7/1995 |
| JP | 2002054644 A | 2/2002 |
| JP | 2007100799 A | 4/2007 |
| JP | 2002139033 A | 5/2007 |
| JP | 4298713 B2 | 7/2009 |
| JP | 2001193735 A | 7/2011 |
| JP | 2014523509 A | 9/2014 |
| KR | 1020110015813 A | 2/2011 |
| WO | 2008074063 A1 | 6/2008 |
| WO | 2013000517 A1 | 1/2013 |
| WO | 2013013005 A1 | 1/2013 |
| WO | 2013117238 A1 | 8/2013 |

OTHER PUBLICATIONS

International Preliminary Report on Patentability for US/PCT2012/047331, dated Jul. 8, 2013.
European Search Report for European Patent Application No. 12162427.4-1758 / 2505858, dated Mar. 30, 2013.
Extended European Search Report for European Patent Application No. 14175715.3-1751 / 2829749, dated Aug. 18, 2015.
Extended European Search Report from European Patent Application No. 12162427.4, dated Aug. 30, 2013.

* cited by examiner

SPHERICAL BEARING WITH SEALING MEMBER MEMBER

CROSS REFERENCE TO RELATED APPLICATIONS

This application is a continuation-in-part of co-pending U.S. application Ser. No. 13/078,486 filed Apr. 1, 2011, which is incorporated herein by reference in its entirety.

FIELD

The present invention relates generally to the field of spherical bearings. More specifically, the present invention relates to the field of self-lubricating spherical bearings.

BACKGROUND

Wear occurs on surfaces which are in sliding contact with one another. High loads can accelerate the rate at which wear occurs. Traditional bearings have metal-on-metal sliding surfaces. Such metal-on-metal bearings require lubrication to reduce friction between the sliding surfaces. If the surface is not properly lubricated the bearing and any associated machinery can be irreparably damaged.

It is known to treat sliding surfaces with a low friction application to reduce friction between the sliding surfaces. A sliding surface treated with a low friction application may be referred to as a self-lubricating surface. Known low friction applications include, but are not limited to, rubber, ceramic, fabric, and resins with lubricant fillers such as polytetrafluoroethylene (PTFE), graphite, and a molybdenum sulfide.

It is further known to use such low friction treatment with spherical bearings. Spherical plain bearings typically have a steel alloy or ceramic ball positioned in a steel alloy race. The race defines an inner surface contoured to receive the spherical ball therein. A lubricant, such as grease, is typically provided between the spherical ball and race to reduce friction during operation. To reduce the need for lubrication, or in lieu of using a lubricant, it is known to apply a low friction treatment to one or more of the bearing surface and or the contoured inner surface of the race.

Despite recent improvements in this technology, many self-lubricating bearings experience ingress of contaminants that degrade the bearing and the self-lubricating coating compositions. Common contaminants may include sand, mud, and particulate contamination. The contaminants enter the bearing between the race and the ball and degrade the sliding surface between the race and the ball.

This problem is especially prevalent for heavy load vehicles used in harsh environments, such as military equipment, construction vehicles, hauling vehicles, mining equipment, and fire trucks. Contamination of the coating composition leads to a rapid increase in the wear rate of the bearing and, in turn, decreases the life of the bearing. Accordingly, a self-lubricating bearing capable of inhibiting contamination of the self coating composition, while maintaining the integrity and usefulness of the bearing is needed.

SUMMARY

In one aspect, the present invention resides in a sealed spherical bearing comprising: a race defining an inner surface, a first annular groove, the first annular groove being open in an axial direction and having a first groove radially inward facing surface and a first groove axially outward facing surface; a ball defining an outer surface configured to engage the race inner surface, the ball disposed in the race, the ball and the race being rotatable relative to each other; a first area of engagement defined by a contoured portion of the ball inner surface and a correspondingly contoured portion of the race outer surface; an annular seal having a first end, a second end, and a midsection, the seal first end defining a seal first leg extending radially outwardly from the midsection a first distance and defining a seal first leg axially outward facing surface, a seal first leg axially inward facing surface and a seal first leg radially outward facing surface, the annular seal extending between the race and the ball; and a retainer having retainer first leg, a retainer transition portion, and a retainer second leg, the retainer first leg extends radially inward from the retainer transition portion a second distance and defines a retainer first leg axially inward facing surface and a retainer first leg axially outward facing surface, the retainer second leg extends axially outward from the transition portion and defines a retainer second leg radially outward facing surface and a retainer second leg radially inward facing surface, the retainer first leg axially outward facing surface secured to the seal first leg axially inward facing surface, the retainer second leg radially inward facing surface secured to the seal first leg radially outward facing surface, the retainer and the annular seal being separately formed elements; wherein the retainer is press-fit into the first annular groove such that the first groove radially inward facing surface engages the retainer second leg radially outward facing surface, the first groove axially outward facing surface engages the retainer first leg axially inward facing surface, and the retainer is fixed relative to the race.

In another aspect, the present invention resides in a sealed spherical bearing comprising: a race defining an inner surface, a first annular groove, the first annular groove being open in an axial direction and having a first groove radially inward facing surface and a first groove axially outward facing surface; a ball defining an outer surface configured to engage the race inner surface, a second annular groove, the ball disposed in the race, the ball and the race being rotatable relative to each other; a first area of engagement defined by a contoured portion of the ball inner surface and a correspondingly contoured portion of the race outer surface; an annular seal extending between the race and the ball, the annular seal having a first end, a second end, and a midsection, wherein the seal first end defines a seal first leg extending radially outwardly from the midsection a first distance and defining a seal first leg axially outward facing surface, a seal first leg axially inward facing surface and a seal first leg radially outward facing surface, and the seal second end defining a bulbous protrusion configured to engage the second annular groove; a retainer having a tapered configuration, a retainer first leg, a retainer transition portion, and a retainer second leg, wherein the retainer first leg extends radially inward from the retainer transition portion a second distance and defines a retainer first leg axially inward facing surface and a retainer first leg axially outward facing surface, the retainer second leg extends axially outwardly and radially outwardly from the retainer transition portion and defines a retainer second leg radially outward facing surface and a retainer second leg radially inward facing surface, and the retainer second leg radially outward facing surface defining a taper angle of up to 15° relative to the retainer second leg radially inward facing surface; the retainer is selectively fabricated from a material having a hardness greater than a hardness of the material from which the seal is selectively fabricated; the retainer first leg axially outward facing surface is secured to the seal first leg axially inward facing surface by one of press fitting and bonding; the retainer second leg radially inward facing surface is secured to the seal first leg radially outward facing surface by one of press fitting and bonding; and the retainer is press-fit into the first annular groove such that the first groove radially inward facing surface engages the retainer second leg radially outward facing surface, the first groove axially outward facing surface engages the retainer first leg axially inward facing surface, and the retainer is fixed relative to the race.

DETAILED DESCRIPTION

Figure 1:
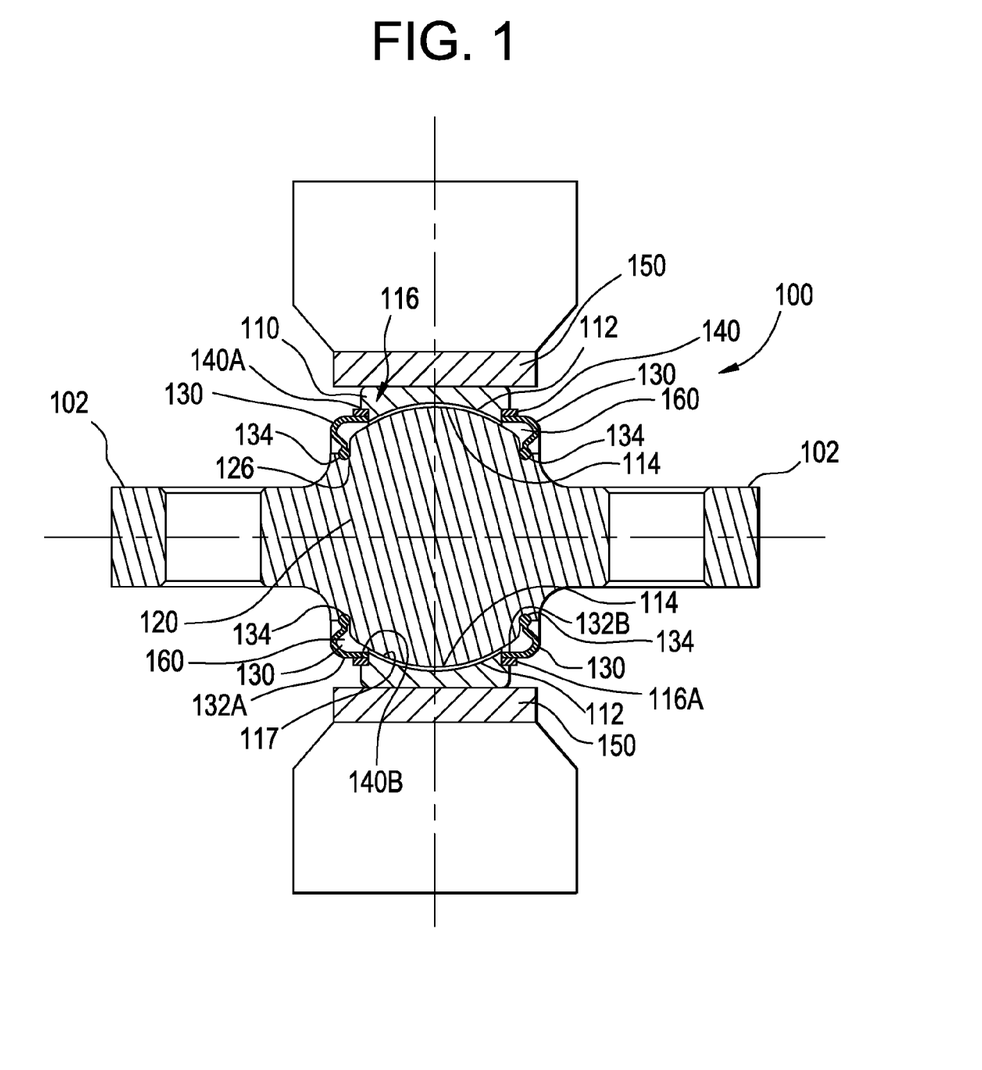
FIG. 1 is a cross sectional view of a sealed spherical bearing in accordance with one embodiment of the present invention.
Figure 2:
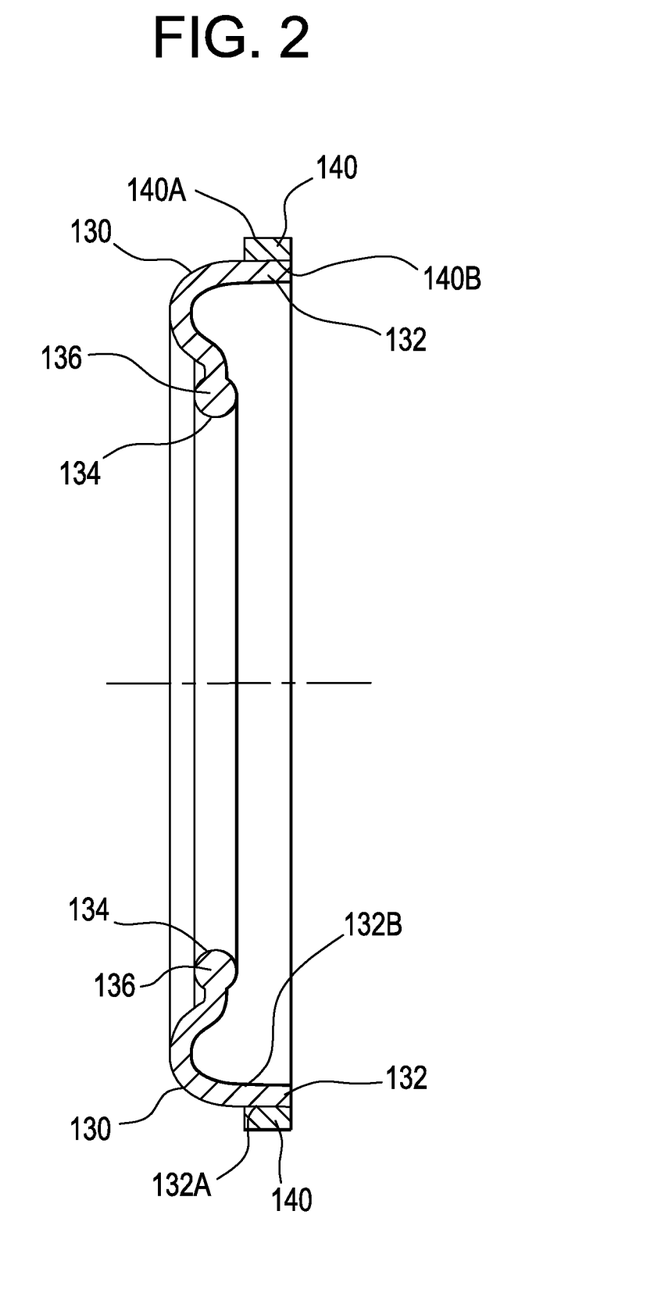
FIG. 2 is a cross sectional view of one embodiment of a seal and a retainer for use with the sealed spherical bearing shown in FIG. 1.
Figure 3:
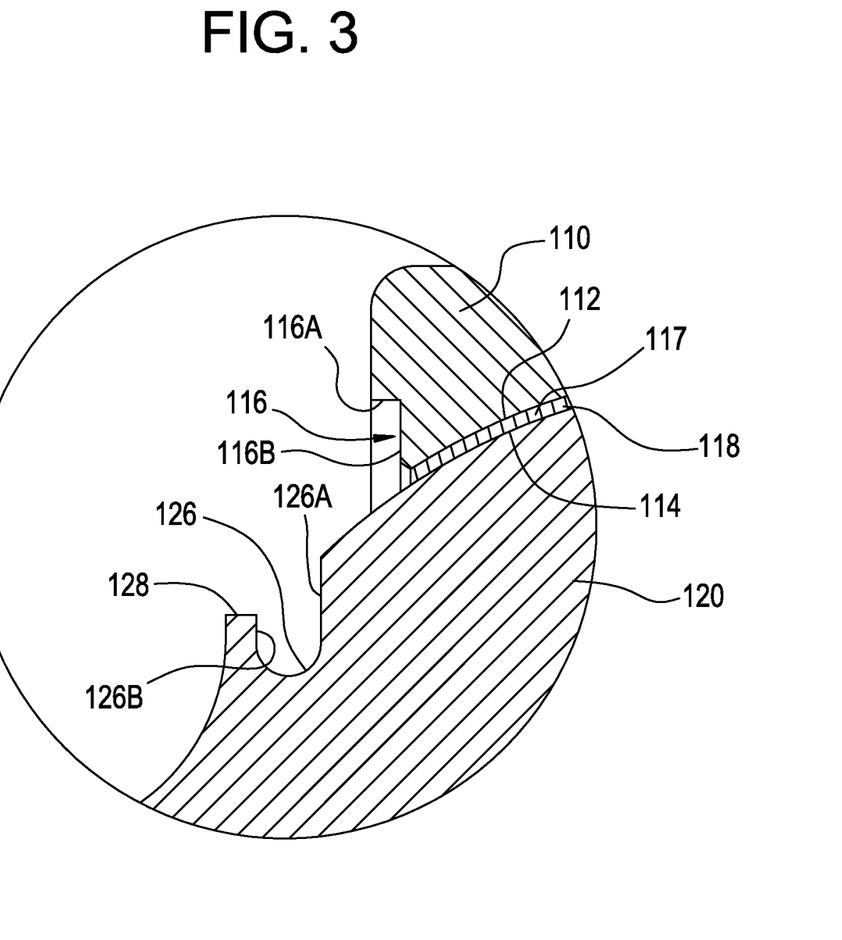
FIG. 3 is a cross sectional view of a portion of the sealed spherical bearing shown in FIG. 1.

In reference to FIGS. 1-3, a bearing 100 in accordance with one embodiment of the present invention is shown. The bearing includes an outer member or race 110 and an inner member or ball 120 disposed therein. The bearing 100 may be received in a housing 150. It should be understood that term ball 120 as used in this application refers to a body adapted to be disposed in race 110 wherein at least a portion of the body is spherical. The race 110 defines an inner surface 112. The inner surface 112 is configured or contoured to engage or receive a correspondingly configured or convex contoured outer surface 114 of the ball 120. When the ball 120 is disposed in the race 110, an area of engagement 117 is defined by the contoured inner surface 112 and the contoured outer surface 114. The ball 120 and the race 110 are rotatable and/or misalignable relative to each other. A shaft 102 extends from opposing sides of the ball 120.

The ball 120 may be made from a steel or a steel alloy. For example, the inner member may be made from AISI 52100, AISI 440C, 4340 or 4130 alloy steel, 17-4PH, 15-5PH, 13PH-8MO. It is also contemplated that the ball 120 may be made from other materials that are sufficiently hard or can be sufficiently hardened through heat treatment. The ball 120 may be chrome plated. As is more fully described below, a self-lubricating treatment may be applied to the contoured surface of the ball 120.

The race 110 may be made from a steel or a steel alloy, including, but not limited to, 4340, 4130, 17-4PH. 15-5PH, 13PH-8MO, or another suitable material. In some embodiments the material may have a lower hardness that allows the race 110 to be formed in a press operation around the ball 120, while still having adequate strength to handle forces during operation of the bearing 100. It is also contemplated that the race 110 may be made of a material that is a sufficient mating surface to a self-lubricating coating composition. The race 110 and the ball 120 may be made of the same or different materials. The housing 150 may also be made from a steel or a steel alloy. The housing 150 is adapted to receive a ball bearing 100.

As shown in detail in FIG. 3, the bearing 100 includes a self-lubricating treatment 118. The self-lubricating treatment 118 may be applied to one or more of the ball contoured outer surface 114 or the race contoured inner surface 112. Prior to application of the self-lubricating treatment 118, one or more of the ball contoured outer surface 114 and the race contoured inner surface 112 are treated to achieve a desired surface finish. One or more of the ball contoured outer surface 114 and the race contoured inner surface 112 is grit-blasted to impose a desired roughness on the surfaces 112, 114. In one instance, grit-blasting is performed with twenty grit size aluminum oxide. However, it is contemplated that in other instances, different grit size and media, such as silicon carbide, may be used.

After achieving the desired surface finish one or more of the surfaces 112, 114, the surface(s) may be cleaned to remove grease and foreign debris. Any method of cleaning that is effective to remove grease and foreign debris may be employed. Methods of cleaning include, but are not limited to, alkaline cleaning, emulsion cleaning, solvent cleaning, vapor degreasing, acid cleaning, pickling, salt bath scaling, and the like. After cleaning, the surface is dried and the self-lubricating treatment 118 is applied.

Suitable methods for depositing self-lubricating treatment 118 include, but are not limited to, spraying, spinning, dipping, injection, bonding, and any other methods effective for depositing a coating on a surface. Once deposited, the self-lubricating treatment 118 may be cured by any method effective to cure a coating composition on a surface and subsequently machined to particularly desired measurements.

In one embodiment, the self-lubricating treatment 118 is a fabric liner system that includes polytetrafluoroethylene (PTFE) fiber that is woven with other fabrics, such as, but not limited to, cotton, polyester, glass fiber, carbon fiber, nylon, aramid materials such as NOMEX® and KEVLAR® manufactured by DuPont. The fabric may then be set in a thermosetting resin. Examples of thermosetting resins include, but are not limited to, phenolic resins, polyester resins, epoxy resins, urethane resins, polyurethane resins, polyimide resins, and the like. In an alternative embodiment, the fabric liner system includes the woven PTFE fiber and chopped PTFE fibers in addition to the other fibers and resins listed above. In yet another embodiment, the fabric liner system includes only chopped PTFE fibers in addition to the other fibers and resins listed above and does not include the woven PTFE fiber.

In another embodiment, the bearing 100 employs a molded or injected self-lubricating liner system that includes a thermosetting resin, such as a phenolic resin, a polyester resin, an epoxy resin, a urethane resin, a polyurethane resin, a polyimide resin, or the like, which is mixed with any one or a combination of the following fibers: PTFE, cotton, polyester, glass fiber, carbon fiber, nylon, or aramid fibers such as NOMEX® and KEVLAR®.

As shown in FIGS. 1 and 2, the bearing 100 includes a seal 130 extending between the race 110 and the ball 120. The seal 130 inhibits the ingress of contaminants into the bearing 100 and prevents such contaminants from impinging the sliding surface formed by the race contoured inner surface 112 and the ball contoured outer surface 114. The seal 130 has a first end 132 and a second end 134. The seal 130 defines a radially outward facing surface 132A and a radially inward facing surface 132B proximate the first end 132. In the embodiments shown in FIGS. 1 and 2, the seal 130 forms a ring. It should be understood that the geometry of the seal 130 may vary depending on the geometry of the race 110, the ball 120, and the bearing 100 generally.

The seal 130 is secured to a retainer 140. The retainer 140 defines a radially outward facing surface 140A and a radially inward facing surface 140B. The retainer 140 is used to engage the first end 132 of the seal 130 in the race 110. The radially inward facing surface 140B of the retainer 140 engages the radially outward facing surface 132A of the annular seal 130. The retainer 140 has a ring shape similar in diameter to the seal 130 as measured at the first end 132. In one embodiment, the radially outward facing surface 140A of the retainer 140 and the radially inward facing surface 140B of the retainer 140 are substantially parallel to one another.

The first end 132 of the seal 130 is secured to the retainer 140 using a bonding agent. In some embodiments, the first end 132 of the seal 130 is secured to the retainer 140 with a press-fit. It should be understood that any known method for securing the first end 132 of the seal 130 to the retainer 140 may be used. It should be further understood that any surface or facing surface of a portion of an embodiment of a seal that is described herein below as secured to any surface or facing surface of a portion of an embodiment of a retainer incorporates the manner of bonding described herein with reference to the seal 130 being secured to the retainer 140.

In reference to FIG. 1, the seal 130 is located between the race 110 and the ball 120. The retainer 140 is press fit into a first annular groove 116 defined by the race 110 (e.g., completely formed in the race 110). As further shown in FIG. 3, the first annular groove 116 defines a substantially uniform radially inward facing surface 116A and an axially outward facing surface 116B. The annular groove 116 is open in an axially outward direction from the axially outward facing surface 116B such that the radially inward facing surface 116A extends continuously axially outward to an end of the race 110. Thus, the axially outward facing surface 116B defines an axial outward end or termination of the area of engagement 117 and the self-lubricating treatment 118 positioned therein.

In one embodiment, the radially outward facing surface 140A of the retainer 140 engages the radially inward facing surface 116A of the annular groove 116. In one embodiment, the annular groove 116 has an L-shaped cross section. After the retainer 140 is press fit into the first annular groove 116, the retainer 140 and seal 130 secured thereto are fixed relative to the race 110. In reference to FIG. 3A, the first annular groove 116 is shown. The first annular groove 116 is sized to receive the retainer 140 therein. In one embodiment, the retainer abuts the axially outward facing surface 116B and extends axially outward beyond the end of the race 110 and the radially inward facing surface 116A. In further reference to FIG. 1, the retainer 140 is press fit into the first annular groove 116 defined by the race 110. This provides an advantage over fixing the first end 132 of the seal 130 to an external housing 150. This method eliminates the need to install the seal 130 into the housing 150 after the bearing 100 is installed in the housing 150.

In the embodiment shown in FIG. 1, the seal 130 is an elastomer. The seal 130 may be made from, for example, natural rubber, silicones, or other synthetic elastomer materials such as, for example, nitrile, silicone, urethane, polyurethane, and the like. The seal 130 is typically made from a material having a hardness value suitable for sealing and durability. The seal 130 may include a pleated section. The pleated section collapses and expands towards and away from the bearing 100 in response to the relative movement of the ball 120 and the race 110.

In the embodiment shown in FIG. 1, the retainer 140 is made from a steel. It should be understood that any known material may be used for the retainer 140 that allows the seal 130 to be secured thereto and that can be press-fit into the first annular groove 116. For example, the retainer 140 may comprise a low carbon steel, a 300 series stainless steel, a corrosion resistant steel, such as, for example, 17-4PH, 15-5PH, 17-7PH, and the like. The profile of the retainer 140 is not limited to one shape or configuration since it is contemplated that the profile of the retainer 140 can vary depending on the geometry of the bearing 100. In any of the embodiments described herein, the seal and the retainer may comprise elements that are separately formed and fabricated from differing materials. The retainer is selectively fabricated from a material having a hardness greater than a hardness of the material from which the seal is selectively fabricated.

Figure 4:
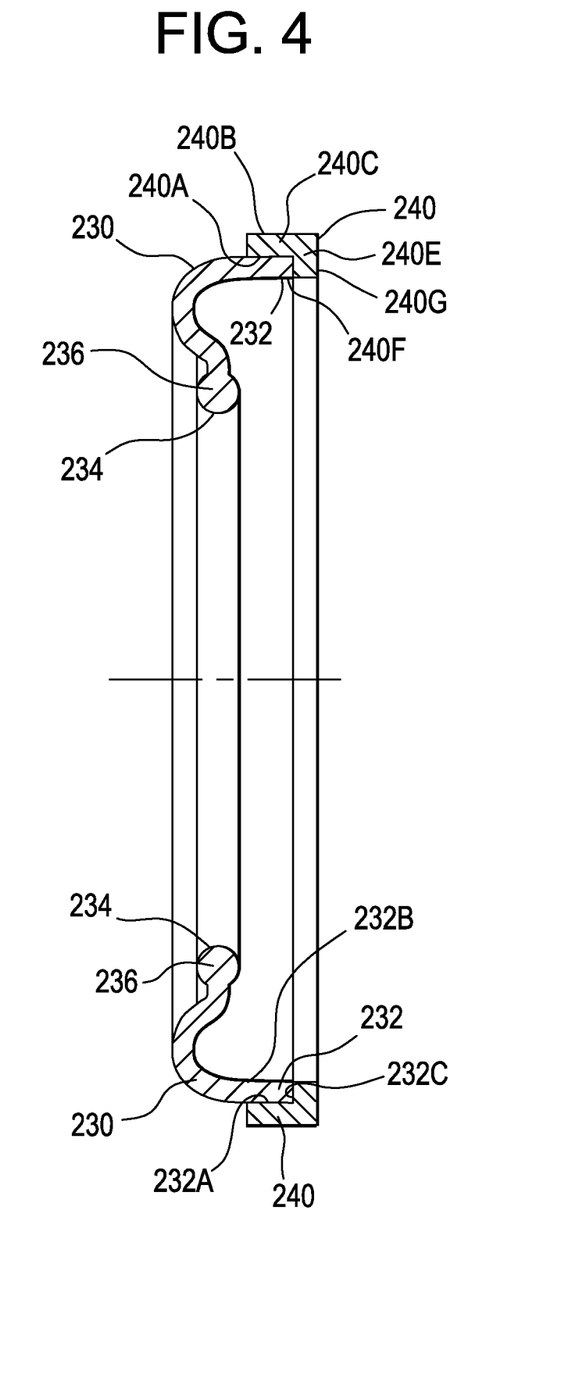
FIG. 4 is a cross sectional view of another embodiment of a seal and a retainer for use with the sealed spherical bearing shown in FIG. 1.

As shown in FIG. 4, another embodiment of a retainer 240 for use with bearing 100 is shown. A seal 230 is secured to the retainer 240. The seal 230 has a first end 232, a second end 234, and forms a ring. The seal 230 defines a radially outward facing surface 232A and a radially inward facing surface 232B proximate the first end 232. The first end 232 of the seal 230 defines an axially inward facing surface 232C. The second end 234 comprises a bulbous protrusion 236. It should be understood that the geometry of the seal 230 may vary depending on the geometry of the race 110, the ball 120, and the bearing 100 generally.

The retainer 240 is used to engage the first end 232 of the seal 230 in the race (not shown in FIG. 4). The retainer 240 has a ring shape similar in diameter to the seal 230 as measured at the first end 232. In the embodiment shown, the retainer 240 is L-shaped in cross-section such that the retainer defines a first leg 240C extending axially outward from a midsection or transition portion 240D, and a second leg 240E extending radially inward from the transition portion 240D. The first leg 240C of the retainer 240 defines a radially outward facing surface 240A and a radially inward facing surface 240B. The second leg 240E of the retainer 240 defines an axially outward facing surface 240F and an axially inward facing surface 240G. The radially inward facing surface 240B of the first leg 240C of the retainer 240 engages the radially outward facing surface 232A of the annular seal 230. The axially outward facing surface 240F of the second leg 240E of the retainer 240 engages the axially inward facing surface 232C of the annular seal 230. The first end 232 of the seal 230 is secured to the retainer 240 using a bonding agent or a press-fit as described above with respect securing seal 130 to retainer 140. The L-shaped retainer helps to ensure a more secure press-fit between the seal and the first groove.

As shown in FIG. 3, the ball 120 defines a second annular groove 126 having an axially inward wall 126A and an axially outward wall 126B. The second annular groove 126 extends along an outer circumference of the ball 120 about the axis of rotation of the ball 120 relative to the race 110. As shown in FIG. 1, the second end 134 of the seal 130 is seated in the second annular groove 126. The second end 134 and the second annular groove 126 form an interference fit. As shown in FIG. 2, the second end 134 comprises a bulbous protrusion 136. The bulbous protrusion, in part, helps to form the interference fit with the second annular groove 126. As further shown in FIG. 3, the axially outward wall 126B defining the second annular groove 126 further defines a lip 128. The lip 128 further serves to form the interference fit. In addition, the lip 128 maintains the second end 134 of the seal 130 seated in the second annular groove 126. In some applications, the spherical bearing is subject to dynamic force loads causing the race 110, and seal 130 fixed relative thereto, to shift relative to the ball 120. The lip 128 maintains the seated position of the second end 134 during such movements.

Figure 5:
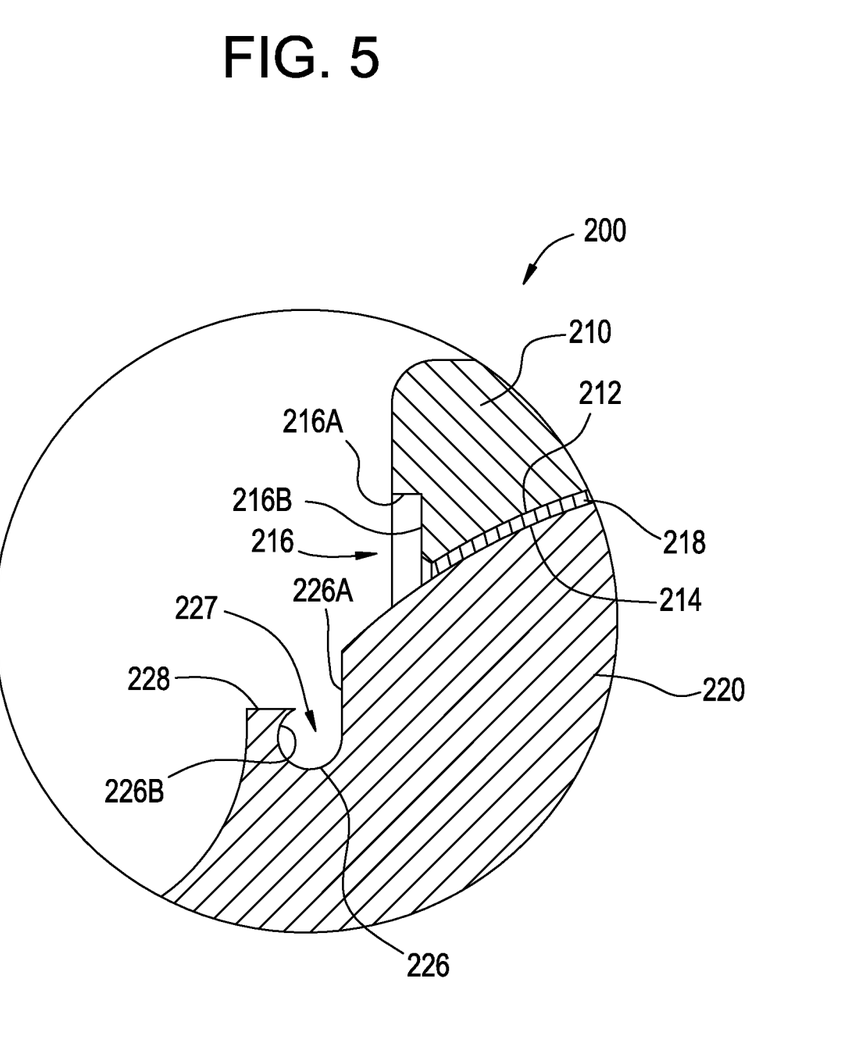
FIG. 5 is a cross sectional view of a sealed spherical bearing in accordance with another embodiment of the present invention.

A spherical bearing 200 in accordance with another embodiment of the present invention is shown in FIG. 5. The bearing 200 includes an outer member or race 210 and an inner member or ball 220 disposed therein. An inner surface 212 of the race 210 is contoured to receive a convex contoured outer surface 214 of the ball 220. A self-lubricating treatment 218 may be applied to one or more of the ball contoured surface outer 214 or the race contoured inner surface 212. The race 210 defines a first annular groove 216 that in turn defines a substantially uniform radially inward facing surface 216A and an axially outward facing surface 216B. The ball 220 defines a second annular groove 226 having an axially inward wall 226A and an axially outward wall 226B which forms a curvilinear lip 228. The curvilinear lip 228 partially closes an opening 227 of the second annular groove 226. In this manner, the bulbous protrusion 136 of second end 132 of the seal 130 (or bulbous protrusion 236 of second end 232 of the seal 230) is secured in the second annular groove 226 by the curvilinear lip 228.

Figure 6:
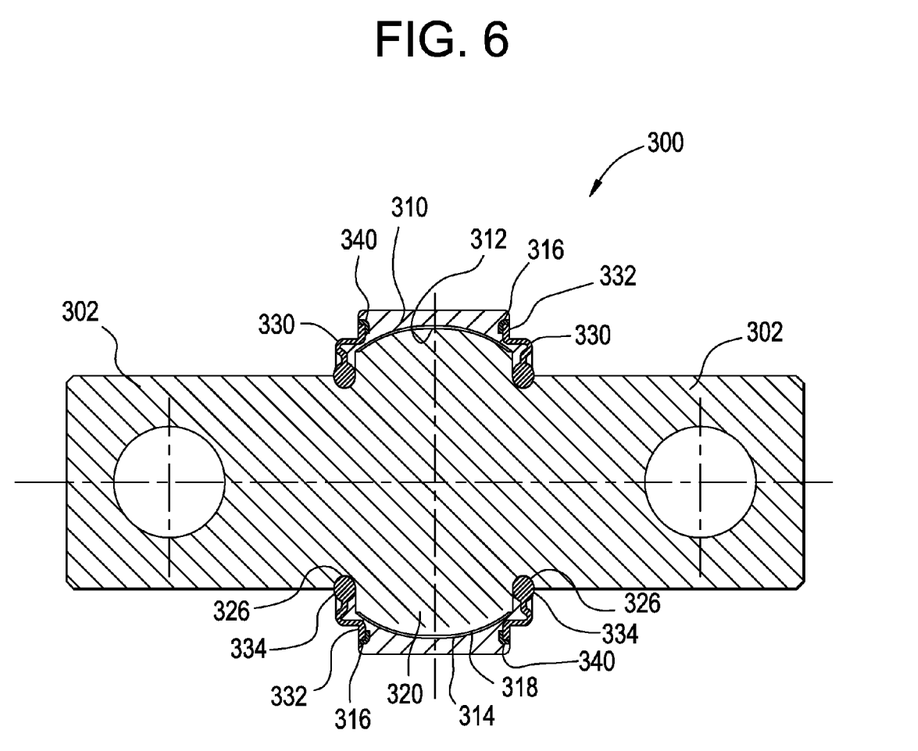
FIG. 6 is a cross sectional view of a sealed spherical bearing in accordance with another embodiment of the present invention.

A spherical bearing 300 in accordance with another embodiment of the present invention is shown in FIG. 6. The bearing 300 includes an outer member or race 310 and an inner member or ball 320 disposed therein. An inner surface 312 of the race 310 is configured or contoured to engage or receive a correspondingly configured or convex contoured outer surface 314 of the ball 320. When the ball 320 is disposed in the race 310, an area of engagement 317 is defined by the contoured inner surface 312 and the contoured outer surface 314. The ball 320 and the race 310 are rotatable and/or misalignable relative to each other. A shaft 302 extends from opposing sides of the ball 320. A self-lubricating treatment 318 may be applied to one or more of the ball contoured outer surface 314 or the race contoured surface 312. The race 310 defines a first annular groove 316 and the ball 320 defines a second annular groove 326.

The bearing 300 includes a seal 330 extending between the race 310 and the ball 320. The seal 330 has a first end 332, a second end 334, and forms a ring. The seal 330 is secured to a retainer 340. The retainer 340 has a ring shape similar in diameter to the seal 330 as measured at the first end 332. The seal 330 is secured to the retainer 340 using a bonding agent or a press-fit as described above with respect securing seal 130 to retainer 140. The retainer 340 together with the first end 332 of the seal 330 is press fit into the first annular groove 316 defined by the race 310. The second end 334 of the seal 330 is seated in the second annular groove 326 defined by the ball 320.

Figure 7:
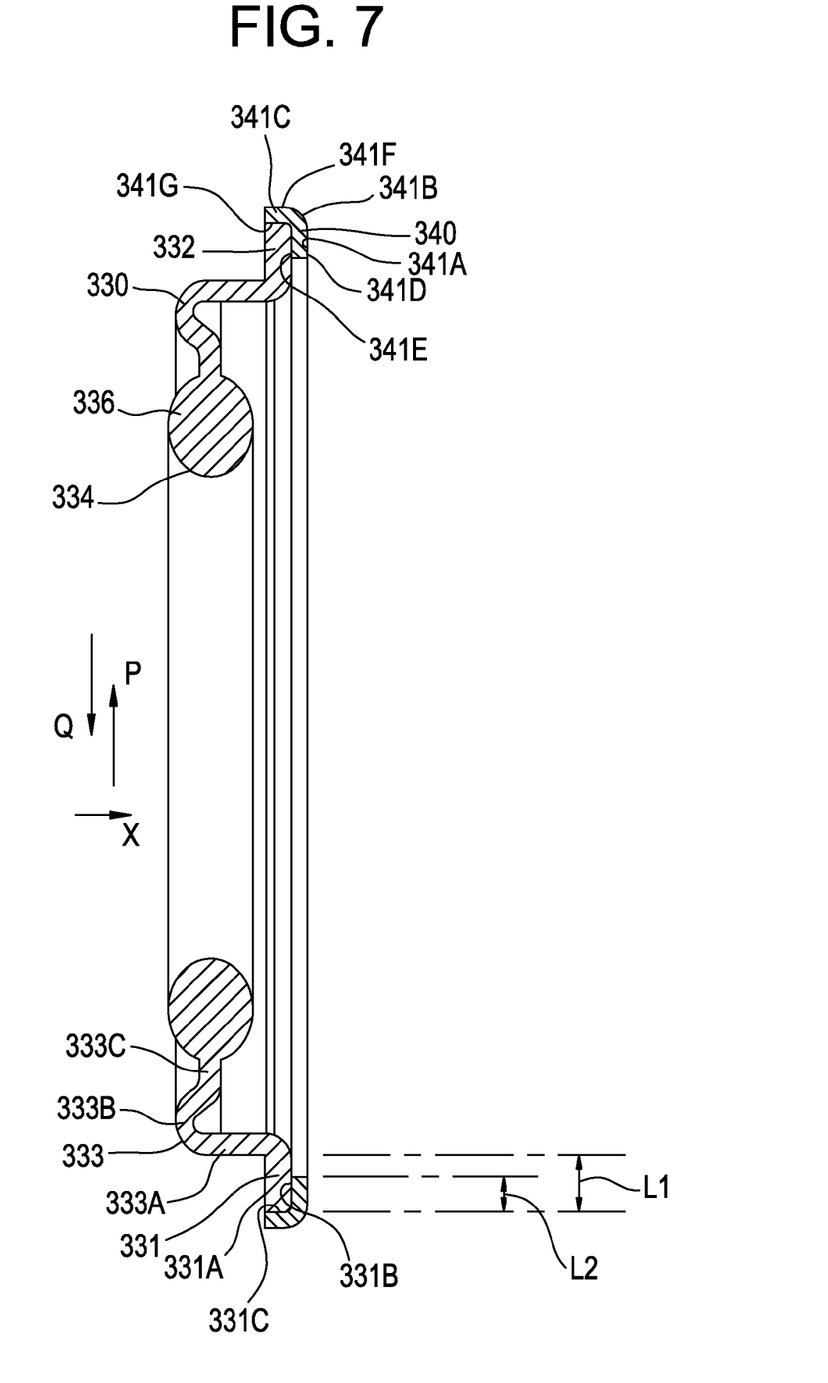
FIG. 7 is a cross sectional view of one embodiment of a seal and a retainer for use with the sealed spherical bearing shown in FIG. 6.

As shown in FIG. 7, the seal 330 is defined by the first end 332, the second end 334, and a midsection 333. The first end 332 is defined by a seal first leg 331 extending radially outwardly from the midsection 333 a distance L1. The seal first leg 331 of seal 330 defines an axially outward facing surface 331A, an axially inward facing surface 331B, and a radially outward facing surface 331C. The second end 334 comprises a bulbous protrusion 336 extending radially inwardly from the midsection 333. The midsection 333 is defined by a first section 333A, a second section 333B and a third section 333C. The second section 333B of midsection 333 comprises a curvilinear section or neck that biases the bulbous protrusion 336 in a radially inward direction denoted by the arrow P, and the seal first leg 331 in a radially outward direction denoted by the arrow Q. The first section 333A of midsection 333 extends in an axially inward direction denoted by the arrow X from the second section 333B of midsection 333 to the seal first leg 331 of seal 330. The third section 333C of midsection 333 extends in radially inward direction P from the second section 333B to the bulbous protrusion 336 of seal 330.

The retainer 340 is L-shaped in cross-section such that the retainer defines a first leg 341A, a midsection or transition portion 341B, and a second leg 341C. The first leg 341A extends radially inward from the transition portion 341B a distance L2. The second leg 341C extends axially outward from the transition portion 341B. The first leg 341A defines an axially inward facing surface 341D and an axially outward facing surface 341E. The second leg 341C defines a radially outward facing surface 341F and a radially inward facing surface 341G. As further shown in FIG. 7, the axially outward facing surface 341E of the first leg 341A of the retainer 340 engages the axially inward facing surface 331B of the seal first leg 331 of the seal 330. The radially inward facing surface 341G of the second leg 341C of the retainer 340 engages the radially outward facing surface 331C of the seal first leg 331 of the seal 330.

The distance L2 of which the first leg 341A of the retainer 340 extends radially inward is proportional to the distance L1 of which the seal first leg 331 extends radially outward. In one embodiment, L2 is in the range of about 25% of L1 to about 75% of L1. In one embodiment, L2 is about 50% of L1. In one embodiment, L2 is about 100% of L1.

Figure 8:
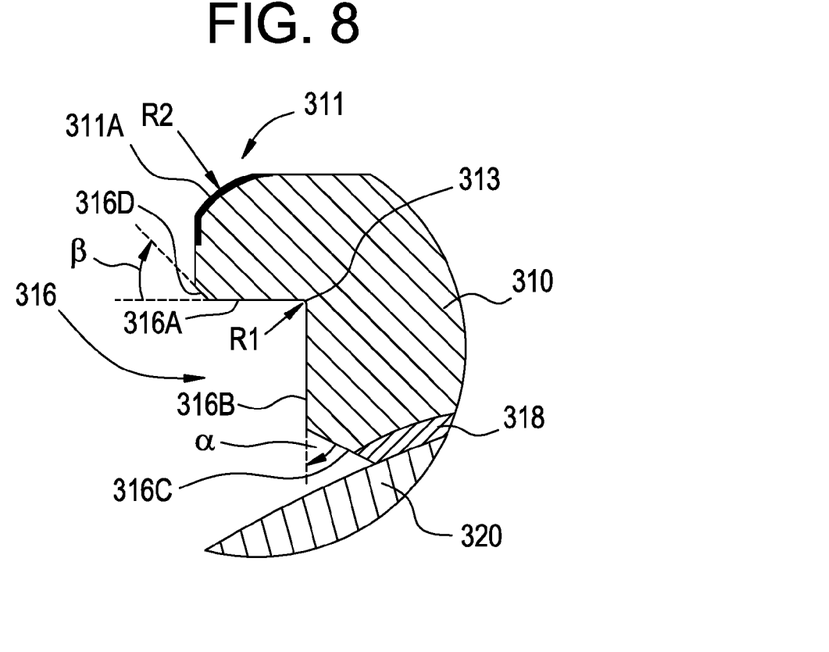
FIG. 8 is a cross sectional view of a portion of the sealed spherical bearing shown in FIG. 7.

In one embodiment as shown in FIG. 8, the first annular groove 316 defined by the race 310 substantially defines an L-shaped cross section. The annular groove 316 defines a substantially uniform radially inward facing surface 316A and an axially outward facing surface 316B. The annular groove 316 is open in an axially outward direction from the axially outward facing surface 316B such that the radially inward facing surface 316A extends continuously axially outward to an end of the race 310. Thus, the axially outward facing surface 316B defines an axial outward end or termination of the area of engagement 317 and the self-lubricating treatment 318 positioned therein.

In one embodiment, a radially inward end of the axially outward facing surface 316B defines a first break 316C forming a first angle or angle α in relation to the axially outward facing surface 316B in the range of about 30° to about 60°, and more particularly about 45°. In this embodiment, a radially inward end of the first break 316C defines an axial outward end or termination of the area of engagement 317 and the self-lubricating treatment 318 positioned therein. In another embodiment, an axially outward end of the radially inward facing surface 316A defines a second break 316D forming a second angle or angle β in relation to the radially inward facing surface 316A in the range of about 30° to about 60°, and more particularly about 45°.

As further shown in FIG. 8, an axially inward end of the radially inward facing surface 316A transitions to a radially outward end of the axially outward facing surface 316B at a midsection or a first groove transition portion 313. In one embodiment, transition portion 313 forms an angle in the range of about 90° such that the radially inward facing surface 316A and the axially outward facing surface 316B are substantially perpendicular in relation to each other. In another embodiment, transition portion 313 defines a rounded configuration having a first radius of curvature R1 in the range of about 0.005 inch to about 0.010 inch, and more particularly in the range of about 0.0075 inch. In yet another embodiment, a radially outward and axially outward end 311 of race 310 defines a rounded configuration or race transition portion 311A having a second radius of curvature R2 in the range of about 0.050 inch to about 0.075 inch.

The first annular groove 316 is sized to receive the retainer 340 therein. The radially outward facing surface 341F of the second leg 341C of the retainer 340 engages the radially inward facing surface 316A of the first annular groove 316. The axially inward facing surface 341D of the first leg 341A of the retainer 340 engages the axially outward facing surface 316B of the first annular groove 316. In one embodiment, the retainer 340 abuts the axially outward facing surface 316B and extends axially outward to the end of the race 310 and the radially inward facing surface 316A.

As shown in FIG. 6, the retainer 340 is press fit into the first annular groove 316 defined by the race 310 such that the retainer 340 and seal 330 secured thereto are fixed relative to the race 310. This provides an advantage over fixing the first end 332 of the seal 330 to an external housing (not shown). This method eliminates the need to install the seal 330 into a housing after the bearing 100 is installed in the housing.

Figure 9:
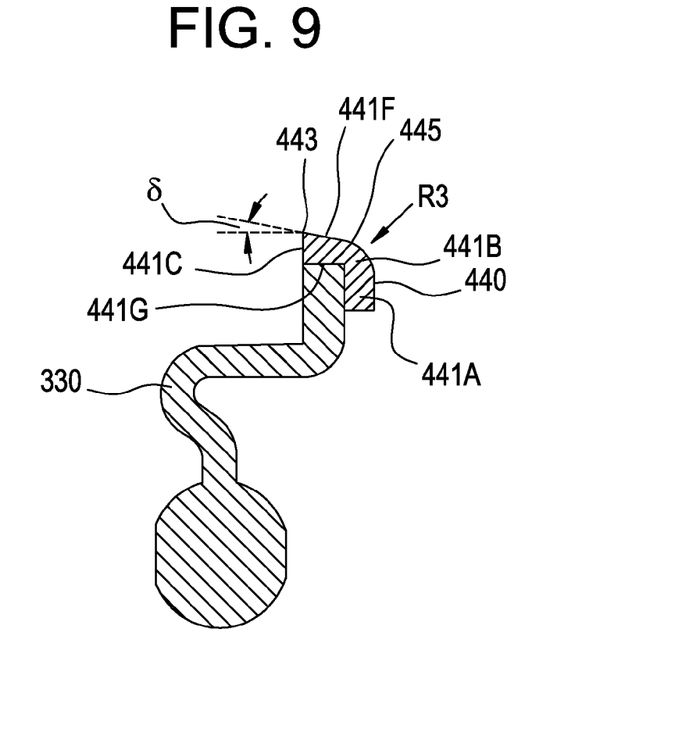
FIG. 9 is a cross sectional view of a portion of the seal and retainer shown in FIG. 7.

Another embodiment of a seal 330 and a retainer 440 for use with bearing 300 is shown in FIG. 9. The retainer 440 is L-shaped in cross-section such that the retainer defines a first leg 441A, a midsection or transition portion 441B, and a second leg 441C. The first leg 441A extends radially inward from the transition portion 441B, and the second leg 441C extends axially outward from the transition portion 441B. The second leg 441C defines a radially outward facing surface 441F and a radially inward facing surface 441G. The retainer 440 engages the seal 330 and the first annular groove 316 of the race 310 in the same manner as described above with reference to the retainer 330.

The retainer, and more particularly the radially outward facing surface 441F of the second leg 441C of the retainer 440, defines a tapered configuration (i.e., a configuration that is not uniformly cylindrical). The retainer second leg radially outward facing surface 441C defines a taper angle or angle δ relative to the retainer second leg radially inward facing surface 441G. The radially outward facing surface 441F extends both axially outwardly and radially outwardly from the transition portion 441B of the retainer 440. The radially outward facing surface 441F defines an axially outward and radially outward distal point 443. The taper angle, angle δ, is more particularly defined between a first line orientation extending axially from distal point 443 and substantially parallel to the radially inward facing surface 441G, and a second line orientation extending from distal point 443 and substantially tangential to the radially outward facing surface 441F. Angle δ is in the range of up to about 15°, and more preferably in the range of up to about 10°. In one embodiment, angle δ is in the range of about 5°. In another embodiment, an axially inward and radially outward portion 445 of transition portion 441B of the retainer 440 defines a rounded configuration having a third radius of curvature R3 in the range of about 0.010 inch to about 0.050 inch, and more particularly in the range of about 0.025 inch to about 0.035 inch.

The retainer 440 is press fit into the first annular groove 316 defined by the race 310 (shown in FIG. 6). The radially outward facing surface 441F of the retainer 440, having a tapered configuration extending both axially outwardly and radially outwardly from the transition portion 441B of the retainer 440, provides a more secure press fit of the seal 330 and the retainer 440 in the first annular groove 316 of the race 310. This more secure press-fit also improves the resistance of the press-fit to entry of contaminants into the bearing.

In one embodiment, for example in bearing 100 shown in FIGS. 1-3, a lubricant, such as a thin film of grease, is disposed on an inside surface of the second annular groove 126 (e.g., one or more of axially inward wall 126A, axially outward wall 126B, and therebetween) and the bulbous protrusion 136 of the seal 130 to reduce friction between the bulbous protrusion 136 of the seal 130 and the inside surface of the second annular groove 126 during rotation of the ball 120 relative to the race 110. A cavity 160 is formed by the race 110, the ball 120, and the seal 130. In some embodiments, a lubricant is further disposed in the cavity 160 to further inhibit the ingress of contaminants between the race 110 and the ball 120.

The bearing 100, 200, 300 may be utilized in a variety of situations and applications, including, but not limited to, suspension systems and steering systems. In one embodiment, the bearing 100 may be utilized in a suspension system of a vehicle and particularly a military vehicle, such as, for example, a tank or transport vehicle. In another embodiment, the bearing 100 may be utilized in a steering system of a vehicle and particularly a military vehicle. The use of the bearing 100 is not limited in this regard as it is contemplated to also be acceptable for use in other applications, such as heavy duty equipment, for example, heavy duty pick-up trucks, dump trucks, fire trucks, mining and construction equipment and vehicles and the like.

Figure 10:
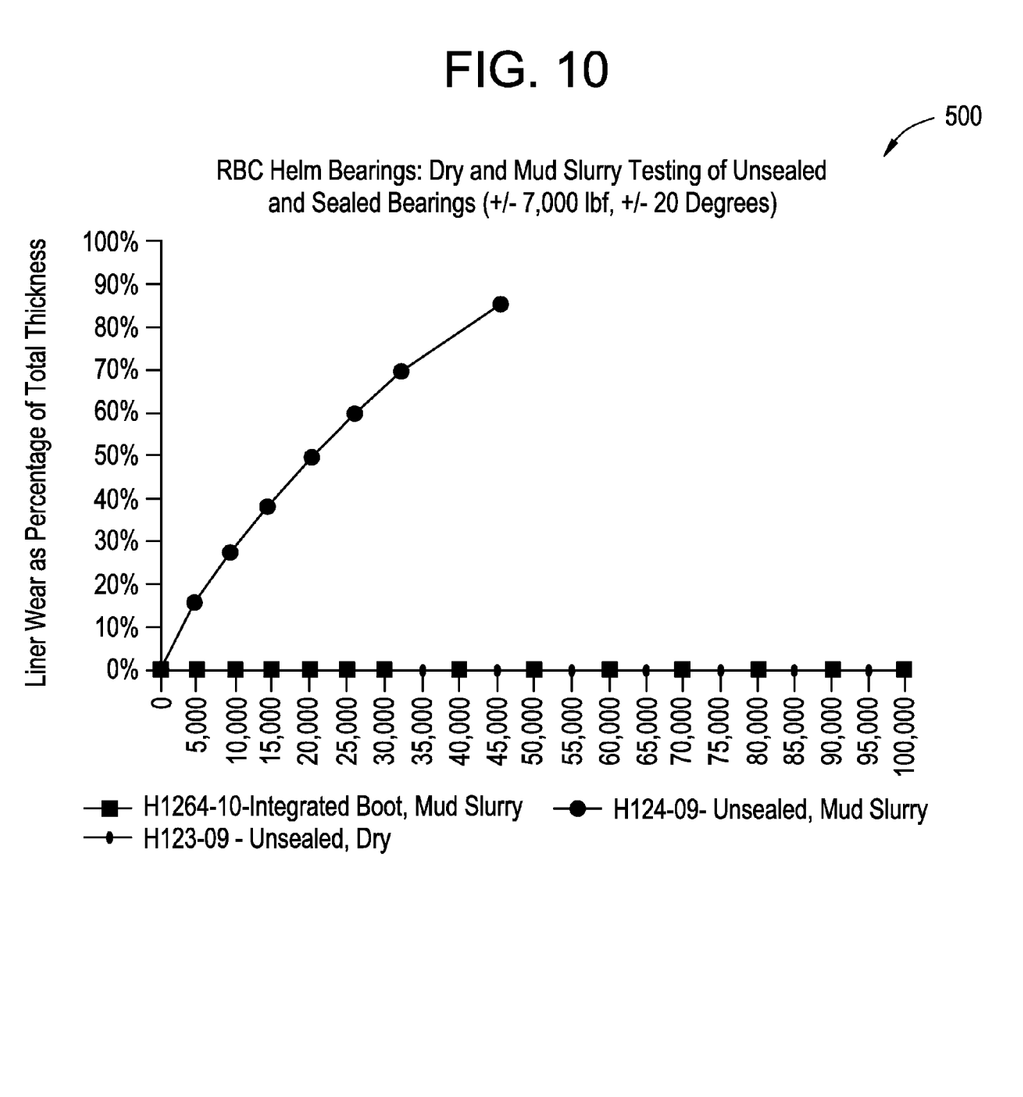
FIG. 10 is a graphical representation of a test performed using a sealed spherical bearing in accordance with one embodiment of the present invention.

In reference to the chart 500 shown in FIG. 10, bench tests were performed with spherical bearings that utilized the above-described sealing member. Tests were conducted both dry (uncontaminated) and immersed in a mud slurry. Results in a mud slurry (contamination) with and without the sealing member show a dramatic difference in terms of performance. The integrated sealing member demonstrates performance levels that are very similar to the test without any contamination at all. Testing in a mud slurry under severe reversing load conditions with cyclic rotation of the bearing shows that the sealing member reduce the wear by 84%.

Figure 11:
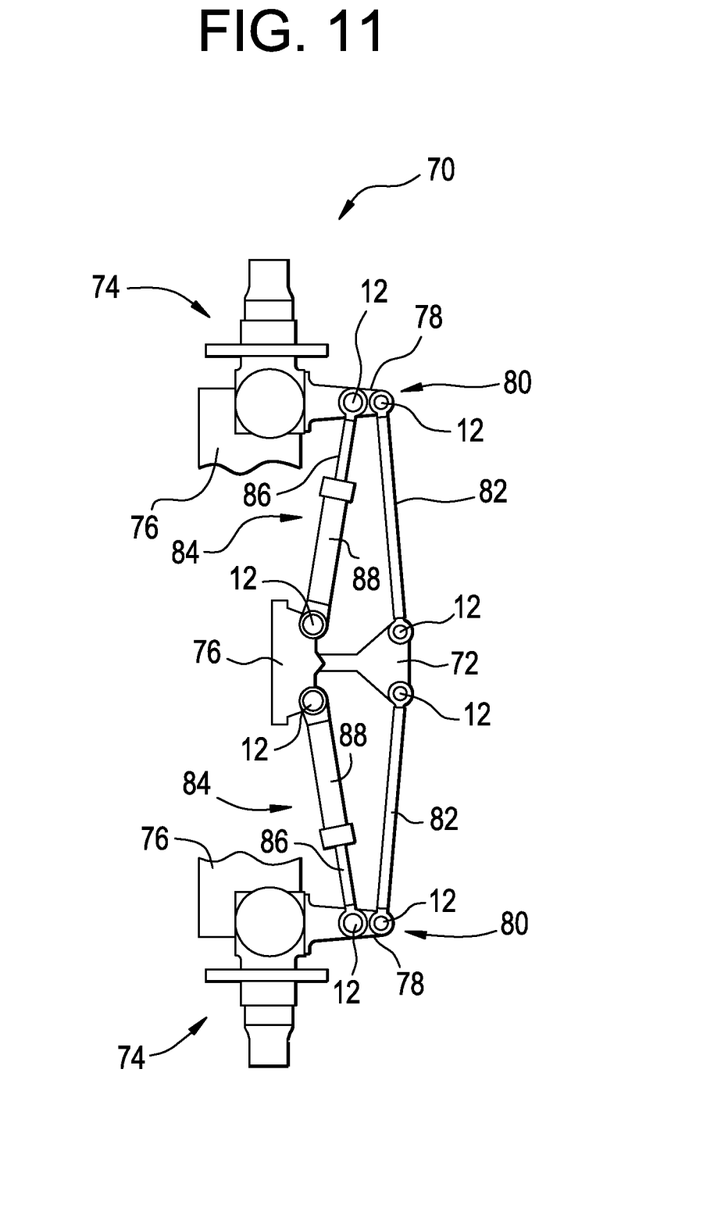
FIG. 11 is a schematic illustration of sealed spherical bearings installed in a steering system.

Referring to FIG. 11, a steering assembly 70 is shown having a steering member 72 and two hubs 74, all pivotally coupled to separate locations on a frame 76. Each of the hubs 74 have a control arm 78 projecting therefrom. A distal end 80 of each of the control arms 78 is pivotally coupled to the steering member 72 by a tie rod 82. In addition, each of the hubs 74 have a piston 84 with one end pivotally coupled to a position adjacent the distal end 80 of the control arm 78 and an opposing end of the piston pivotally coupled to the frame 76. The pistons 84 each include a cylinder portion 86 slidingly disposed within a tube portion 88 so that the opposing ends can move toward and/or away from each other in response to forces applied thereto.

Each of the tie rods 82 and pistons 84 have a spherical bearing 12, for example one of the bearings 100 and 200 described above, positioned in opposing ends thereof for providing the pivotal coupling with the frame 76, the control arm 78 and/or the steering member 72. The steering assembly 70 described herein has utility, for example, in off-highway heavy haul trucks which operate in conditions subject to much contamination. Use of the spherical bearings 12 extend the useful life of the steering assembly 70 of a heavy haul truck by improving lubrication and mitigating the potential for contaminants to enter the spherical bearing.

Although the present invention has been disclosed and described with reference to certain embodiments thereof, it should be noted that other variations and modifications may be made, and it is intended that the following claims cover the variations and modifications within the true scope of the invention.

The invention claimed is:

1. A sealed spherical bearing comprising:
a race defining an inner surface, a first annular groove, the first annular groove being open in an axial direction and having a first groove radially inward facing surface and a first groove axially outward facing surface;
a ball defining an outer surface configured to engage the race inner surface, the ball disposed in the race, the ball and the race being rotatable relative to each other;
a first area of engagement defined by a contoured portion of the ball outer surface and a correspondingly contoured portion of the race inner surface;
an annular seal having a first end, a second end, and a midsection, the seal first end defining a seal first leg extending radially outwardly from the midsection a first distance and defining a seal first leg axially outward facing surface, a seal first leg axially inward facing surface and a seal first leg radially outward facing surface, the annular seal extending between the race and the ball, the seal second end engaging the ball; and
an annular retainer having retainer first leg, a retainer transition portion, and a retainer second leg, the retainer first leg extends radially inward from the retainer transition portion a second distance and defines a retainer first leg axially inward facing surface and a retainer first leg axially outward facing surface, the retainer second leg extends axially outward from the transition portion and defines a retainer second leg radially outward facing surface and a retainer second leg radially inward facing surface, the retainer first leg axially outward facing surface secured to the seal first leg axially inward facing surface, the retainer second leg radially inward facing surface secured to the seal first leg radially outward facing surface, the retainer and the annular seal being separately formed elements;
the retainer having a tapered configuration defined by the retainer second leg radially outward facing surface, the retainer second leg radially outward facing surface defining a taper angle of up to 15° relative to the retainer second leg radially inward facing surface;
wherein the retainer is press-fit into the first annular groove such that the first groove radially inward facing surface engages the retainer second leg radially outward facing surface press-fit therein, the first groove axially outward facing surface engages the retainer first leg axially inward facing surface, and the retainer is fixed relative to the race.

2. The sealed spherical bearing of claim 1, wherein the first distance that the seal first leg extends radially outward is proportional to the second distance that the retainer first leg extends radially inward.

3. The sealed spherical bearing of claim 2, wherein the second distance that the retainer first leg extends radially inward is in the range of about 25% to about 75% of the first distance that the seal first leg extends radially outward.

4. The sealed spherical bearing of claim 1, further comprising:
a self-lubricating treatment positioned on at least one of the contoured portion of the race inner surface and the contoured portion of the ball outer surface defining the first area of engagement therebetween.

5. The sealed spherical bearing of claim 1, wherein the first groove axially outward facing surface defines an axial outward termination of the first area of engagement.

6. The sealed spherical bearing of claim 1, further comprising:
a first break defined in a radially inward end of the first groove axially outward facing surface, the first break defining a first angle in relation to the first groove axially outward facing surface in the range of about 30° to about 60°.

7. The sealed spherical bearing of claim 1, further comprising:
a second break defined in an axially outward end of the first groove radially inward facing surface, the second break defining a second angle in relation to the first groove radially inward facing surface in the range of about 30° to about 60°.

8. The sealed spherical bearing of claim 1, further comprising:
a first groove transition portion defined between an axially inward end of the first groove radially inward facing surface and a radially outward end of the first groove axially outward facing surface, the first groove transition portion defining a rounded configuration having a first radius of curvature in the range of about 0.005 inch to about 0.010 inch.

9. The sealed spherical bearing of claim 1, further comprising:
a race transition portion defined at a radially outward and axially outward end of the race, the race transition portion defining a rounded configuration having a second radius of curvature in the range of about 0.050 inch to about 0.075 inch.

10. The sealed spherical bearing of claim 1, wherein the taper angle is in the range of about 5°.

11. The sealed spherical bearing of claim 1, wherein:
the retainer transition portion defines a rounded configuration having a third radius of curvature in the range of about 0.025 inch to about 0.035 inch.

12. The sealed spherical bearing of claim 1, further comprising:
a second annular groove defined by the ball; and
a bulbous protrusion defined by the seal second end;
wherein the bulbous protrusion is seated in the second annular groove.

13. The sealed spherical bearing of claim 12, wherein a wall defining at least a portion of the second annular groove further defines a curvilinear lip configured to secure the bulbous protrusion in the second annular groove.

14. The sealed spherical bearing of claim 12 further comprising:
a lubricant disposed on one or more of an inside surface of the second annular groove and the seal second end to reduce friction generated between the seal second end and the second annular groove during a rotation of the ball relative to the seal.

15. The sealed spherical bearing of claim 12, further comprising:
a lubricant disposed in a cavity formed by the race, the seal, and the ball.

16. The sealed spherical bearing of claim 1, wherein the sealed spherical bearing is installed in a housing.

17. The sealed spherical bearing of claim 1, wherein the seal is fabricated from an elastomeric material and the retainer is fabricated from a metallic material.

18. The sealed spherical bearing of claim 1, wherein the retainer is selectively fabricated from a material having a hardness greater than a hardness of the material from which the seal is selectively fabricated.

19. The sealed spherical bearing of claim 1, wherein:
the retainer first leg axially outward facing surface is secured to the seal first leg axially inward facing surface by one of press fitting and bonding, and
the retainer second leg radially inward facing surface is secured to the seal first leg radially outward facing surface by one of press fitting and bonding.

20. A sealed spherical bearing comprising:
a race defining an inner surface, a first annular groove, the first annular groove being open in an axial direction and having a first groove radially inward facing surface and a first groove axially outward facing surface;
a ball defining an outer surface configured to engage the race inner surface, a second annular groove, the ball disposed in the race, the ball and the race being rotatable relative to each other;
a first area of engagement defined by a contoured portion of the ball outer surface and a correspondingly contoured portion of the race inner surface;
an annular seal extending between the race and the ball, the annular seal having a first end, a second end, and a midsection, wherein:
the seal first end defines a seal first leg extending radially outwardly from the midsection a first distance and defining a seal first leg axially outward facing surface, a seal first leg axially inward facing surface and a seal first leg radially outward facing surface, and
the seal second end defines a bulbous protrusion configured to engage the second annular groove;
a retainer having a tapered configuration, a retainer first leg, a retainer transition portion, and a retainer second leg, wherein:
the retainer first leg extends radially inward from the retainer transition portion a second distance and defines a retainer first leg axially inward facing surface and a retainer first leg axially outward facing surface,
the retainer second leg extends axially outwardly and radially outwardly from the retainer transition portion and defines a retainer second leg radially outward facing surface and a retainer second leg radially inward facing surface, and
the retainer second leg radially outward facing surface defining a taper angle of up to 15° relative to the retainer second leg radially inward facing surface;
the retainer is selectively fabricated from a material having a hardness greater than a hardness of the material from which the seal is selectively fabricated;
the retainer first leg axially outward facing surface is secured to the seal first leg axially inward facing surface by one of press fitting and bonding;
the retainer second leg radially inward facing surface is secured to the seal first leg radially outward facing surface by one of press fitting and bonding; and
the retainer is press-fit into the first annular groove such that the first groove radially inward facing surface engages the retainer second leg radially outward facing surface press-fit therein, the first groove axially outward facing surface engages the retainer first leg axially inward facing surface, and the retainer is fixed relative to the race.

* * * * *